United States Patent
Chiba (10) Patent No.: US 12,441,311 B2
(45) Date of Patent: Oct. 14, 2025

(54) VEHICLE CONTROL DEVICE

(71) Applicant: TOYOTA JIDOSHA KABUSHIKI KAISHA, Toyota (JP)

(72) Inventor: Masamu Chiba, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 65 days.

(21) Appl. No.: 18/526,262

(22) Filed: Dec. 1, 2023

(65) Prior Publication Data

US 2024/0246535 A1    Jul. 25, 2024

(30) Foreign Application Priority Data

Jan. 23, 2023  (JP) ................. 2023-008083

(51) Int. Cl.
*B60W 30/095* (2012.01)
*B60W 30/09* (2012.01)
*B60W 30/10* (2006.01)
*B60W 30/12* (2020.01)

(52) U.S. Cl.
CPC ............ *B60W 30/12* (2013.01); *B60W 30/09* (2013.01); *B60W 30/095* (2013.01); *B60W 30/0956* (2013.01); *B60W 30/10* (2013.01); *B60W 2554/4041* (2020.02); *B60W 2554/801* (2020.02)

(58) Field of Classification Search
CPC .............. B60W 30/09; B60W 30/095; B60W 30/0956; B60W 30/10; B60W 30/12; B60W 2554/40; B60W 2554/801

USPC .............................. 701/41, 43, 44
See application file for complete search history.

(56) References Cited

U.S. PATENT DOCUMENTS

| | | | |
|---|---|---|---|
| 7,692,534 B2 | 4/2010 | Kataoka et al. | |
| 8,352,124 B2 | 1/2013 | Taguchi | |
| 8,682,500 B2 | 3/2014 | Sakugawa | |
| 8,818,634 B2 | 8/2014 | Fujita et al. | |
| 9,168,953 B2 | 10/2015 | Mitsumoto et al. | |
| 9,714,034 B2 | 7/2017 | Otake et al. | |
| 9,880,558 B2 | 1/2018 | Nakamura | |
| 9,902,399 B2 | 2/2018 | Torii et al. | |
| 10,345,443 B2 | 7/2019 | Masui et al. | |
| 10,611,240 B2 | 4/2020 | Masui et al. | |
| 2019/0071098 A1* | 3/2019 | Asakura | G08G 1/167 |

(Continued)

FOREIGN PATENT DOCUMENTS

JP          2011-073530 A      4/2011

*Primary Examiner* — Erick R Solis
(74) *Attorney, Agent, or Firm* — Sughrue Mion, PLLC (57) ABSTRACT

A vehicle control device is a device that can execute obstacle avoidance control and lane departure prevention control. The obstacle avoidance control sets a target trajectory for avoiding an obstacle that is present in the forward traveling direction of a host vehicle and controls the host vehicle so that the host vehicle travels along the target trajectory. The lane departure prevention control prevents the host vehicle from departing from a driving lane, in which the host vehicle is traveling, when the host vehicle is about to depart from the driving lane. When the lane departure prevention control is to be executed while the obstacle avoidance control is being executed to avoid the obstacle, the vehicle control device executes the lane departure prevention control to cause the host vehicle to move toward the center of the driving lane after the host vehicle passes the obstacle.

10 Claims, 4 Drawing Sheets

(56) References Cited

U.S. PATENT DOCUMENTS

| | | | |
|---|---|---|---|
| 2020/0086866 A1* | 3/2020 | Miura | B60W 40/105 |
| 2020/0317192 A1* | 10/2020 | Awane | B62D 15/025 |
| 2021/0188258 A1* | 6/2021 | Goto | B60W 30/0956 |
| 2023/0054263 A1* | 2/2023 | Lin | B60W 30/0956 |
| 2024/0043009 A1* | 2/2024 | Igarashi | B60W 30/0956 |
| 2024/0174223 A1* | 5/2024 | Park | B60W 40/04 |
| 2024/0319732 A1* | 9/2024 | Bohnsack | B60W 60/00 |

* cited by examiner

VEHICLE CONTROL DEVICE

CROSS-REFERENCE TO RELATED APPLICATION

This application claims priority to Japanese Patent Application No. 2023-008083 filed on Jan. 23, 2023, incorporated herein by reference in its entirety.

BACKGROUND

1. Technical Field

The present disclosure relates to the technical field of a vehicle control device.

2. Description of Related Art

As a device of this type, a device is proposed in which at least one of the yaw moment of the brake control device and the assist steering torque of the steering control device is controlled to prevent a lane departure or a collision with a surrounding obstacle, for example, when a vehicle is about to depart from the lane or to collide with the surrounding obstacle (see Japanese Unexamined Patent Application Publication No. 2011-073530 (JP 2011-073530 A)).

SUMMARY

When the host vehicle is automatically steered away from an obstacle in order to avoid it and, as a result, is about to depart from the lane, the host vehicle is automatically steered to move toward the center of the lane. In this case, there is a possibility that the host vehicle performs the behavior in which the host vehicle moves toward the obstacle. Such a behavior is not considered in JP 2011-073530 A.

In view of the problem described above, it is an object of the present disclosure to provide a vehicle control device that can prevent a host vehicle from performing a behavior in which, even if control is performed to prevent the host vehicle from departing from the lane, the vehicle travels toward an obstacle.

One aspect of the present disclosure is a vehicle control device that is able to execute obstacle avoidance control and lane departure prevention control. The obstacle avoidance control is configured to set a target trajectory for avoiding an obstacle that is present in the forward traveling direction of a host vehicle and configured to control the host vehicle so that the host vehicle travels along the target trajectory. The lane departure prevention control is configured to prevent the host vehicle from departing from the driving lane, in which the host vehicle is traveling, when the host vehicle is about to depart from the driving lane. When the lane departure prevention control is to be executed while the obstacle avoidance control is being executed to avoid the obstacle, the vehicle control device is configured to execute the lane departure prevention control to cause the host vehicle to move toward the center of the driving lane after the host vehicle passes the obstacle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of a vehicle control device will be described with reference to the drawings.

First Embodiment

Figure 1:
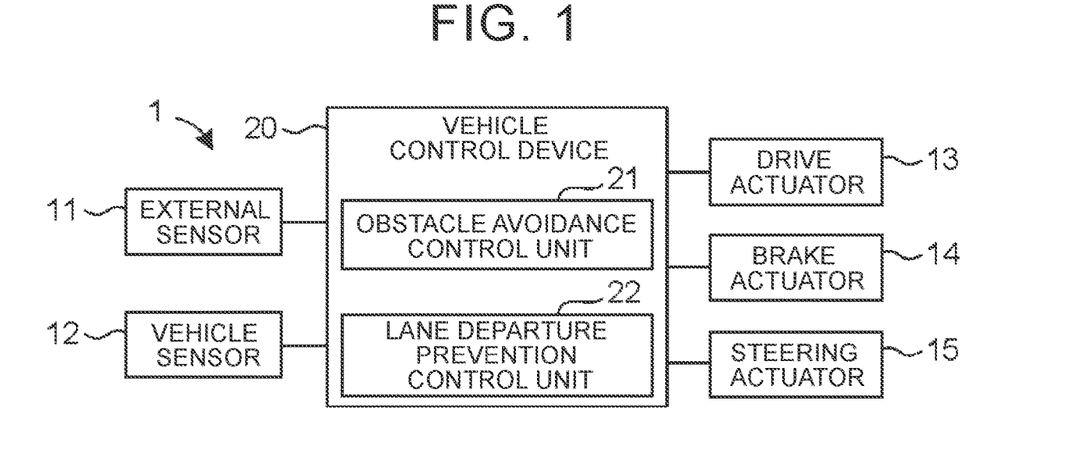
FIG. 1 is a block diagram showing a configuration of a vehicle according to a first embodiment.

A first embodiment of the vehicle control device will be described with reference to FIG. 1 to FIG. 3. First, a vehicle 1 having a vehicle control device 20 will be described with reference to FIG. 1. In FIG. 1, the vehicle 1 includes an external sensor 11, a vehicle sensor 12, a drive actuator 13, a brake actuator 14, a steering actuator 15, and a vehicle control device 20. The external sensor 11 may include at least one of a camera that captures the surroundings of the vehicle 1, a radar sensor, and a laser imaging detection and ranging (LiDAR) sensor. The vehicle sensor 12 may include at least one of a speed sensor, an acceleration sensor, and a yaw rate sensor.

When the vehicle 1 is a vehicle equipped with an engine, the drive actuator 13 controls the amount of air supplied to the engine (for example, throttle valve opening degree) according to the control signal from the vehicle control device 20 to control the driving force of the vehicle 1. When the vehicle 1 is a hybrid electric vehicle, the control signal from the vehicle control device 20 is input to the drive actuator 13 as well as to the motor that is the power source. As a result, the driving force of the motor is controlled. When the vehicle 1 is a battery electric vehicle, the control signal from the vehicle control device 20 is input to the motor that is the power source. In this case, the vehicle 1 may not have the drive actuator 13.

The brake actuator 14 controls the brake system according to the control signal from the vehicle control device 20 to control the braking force applied to the wheels of the vehicle 1. The steering actuator 15 controls the driving of the assist motor, which controls the steering torque in the electric power steering system, according to the control signal from the vehicle control device 20. By doing so, the steering actuator 15 controls the steering torque of the vehicle 1.

The vehicle control device 20 may include an electronic control unit (ECU). The vehicle control device 20 may recognize the surrounding situation of the vehicle 1 based on the output of the external sensor 11. The surrounding situation of the vehicle 1 may include at least one of lines indicating lanes, traffic lights, road signs, road markings, other vehicles, pedestrians, bicycles, and obstacles. The vehicle control device 20 may obtain the behavior of the vehicle 1 based on the output of the vehicle sensor 12. The behavior of the vehicle 1 may include at least one of speed, longitudinal acceleration, lateral acceleration, vertical acceleration, yaw rate, and yaw moment. The vehicle control device 20 may set the target trajectory of the vehicle 1 based on the surrounding situation of the vehicle 1 recognized as described above. The vehicle control device 20 may control at least one of the drive actuator 13, brake actuator 14 and steering actuator 15 according to the behavior of the vehicle 1, obtained as described above, so that the vehicle 1 travels along the target trajectory. That is, the vehicle control device 20 may drive the vehicle 1 autonomously.

The vehicle control device 20 includes therein an obstacle avoidance control unit 21 and a lane departure prevention control unit 22 as logically constructed logic blocks or physically implemented processing circuits. When there is an obstacle in the forward driving direction of the vehicle 1, the obstacle avoidance control unit 21 executes obstacle avoidance control in which the obstacle avoidance control unit 21 sets a target trajectory for the vehicle 1 to avoid the obstacle and controls the vehicle 1 so that the vehicle 1 travels along the target trajectory (more specifically, the obstacle avoidance control unit 21 controls at least one of the drive actuator 13, brake actuator 14 and steering actuator 15). The obstacle in the forward driving direction of the vehicle 1 may be detected from the surrounding situation of the vehicle 1 recognized based on the output of the external sensor 11.

The lane departure prevention control unit 22 executes lane departure prevention control that, when the vehicle 1 is about to depart from the driving lane in which the vehicle 1 is traveling, prevents the vehicle 1 from departing from the driving lane. In this case, the lane departure prevention control unit 22 may prevent the vehicle 1 from departing from the driving lane by causing the steering actuator 15 to generate a steering torque to bring the vehicle 1 toward the center of the driving lane. Alternatively, the lane departure prevention control unit 22 may prevent the vehicle 1 from departing from the driving lane by causing the brake actuator 14 to generate a yaw moment in the vehicle 1 to bring the vehicle 1 toward the center of the driving lane. In this case, whether or not the vehicle 1 is about to depart from the driving lane may be determined based on the positional relationship between the position of the vehicle 1 in the near future (for example, in several hundred milliseconds to several seconds) and the line indicating the driving lane (for example, a white line or a yellow line). When the position of the vehicle 1 in the near future is outside the driving lane, the lane departure prevention control unit 22 may determine that the vehicle 1 is about to depart from the driving lane.

Figure 2A:
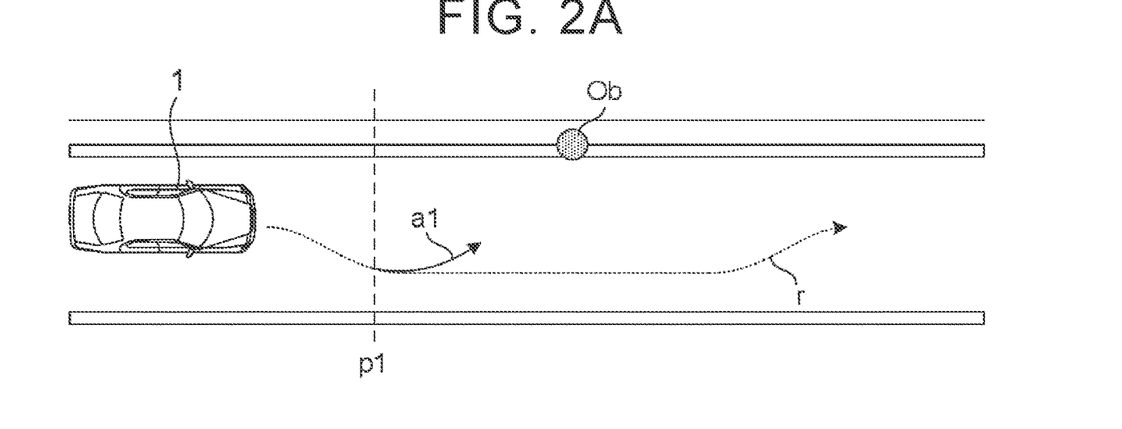
FIG. 2A is a diagram showing an example of the behavior of the vehicle.

The obstacle avoidance control unit 21 and the lane departure prevention control unit 22 are independent of each other. When the lane departure prevention control unit 22 determines whether the vehicle 1 is about to depart from the driving lane, the information on the obstacle is not necessary. For this reason, out of the information on the situation around the vehicle 1 recognized based on the output of the external sensor 11, the lane departure prevention control unit 22 does not receive, in many cases, the information other than the information on the lines indicating the driving lane. This can lead to a technical problem described below:

Assume that there is an obstacle Ob in the forward driving direction of the vehicle 1 as shown in FIG. 2A. In this case, since there is the obstacle Ob, the obstacle avoidance control unit 21 sets a target trajectory r for the vehicle 1 to avoid the obstacle Ob. After that, the obstacle avoidance control unit 21 controls at least one of the drive actuator 13, brake actuator 14, and steering actuator 15 so that the vehicle 1 travels along the target trajectory r. In this case, if no action is taken, the lane departure prevention control unit 22 may execute the lane departure prevention control, for example, when the vehicle 1 traveling along the target trajectory r reaches point p1. As a result, the vehicle 1 may move toward the center of the driving lane along arrow a1 shown in FIG. 2A. That is, as a result of conflict between the obstacle avoidance control and the lane departure prevention control, the vehicle 1 may travel toward the obstacle Ob that the vehicle 1 should avoid.

Figure 3:
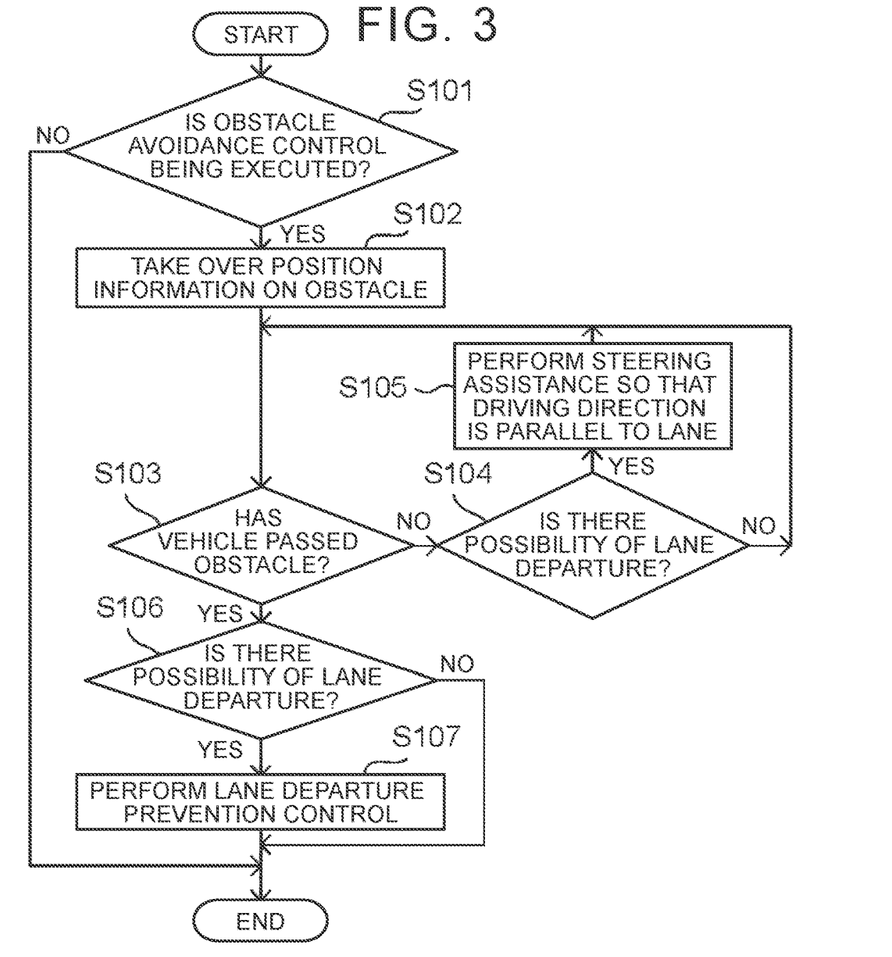
FIG. 3 is a flowchart showing the operation of a vehicle control device according to the first embodiment.

In view of the technical problem described above, the lane departure prevention control unit 22 performs the operation shown in the flowchart in FIG. 3 in this embodiment. In FIG. 3, the lane departure prevention control unit 22 determines whether the obstacle avoidance control is being executed by the obstacle avoidance control unit 21 (step S101). When it is determined in the processing in step S101 that the obstacle avoidance control is not being executed (step S101: No), the operation shown in FIG. 3 ends. After that, the processing in step S101 may be performed when a predetermined time has passed. That is, the operation shown in FIG. 3 may be repeatedly performed at a cycle corresponding to the predetermined time.

When it is determined in the processing in step S101 that the obstacle avoidance control is being executed (step S101: Yes), the lane departure prevention control unit 22 takes over the position information, which indicates the position of the obstacle, from the obstacle avoidance control unit 21 (in other words, acquires the position information indicating the position of the obstacle) (step S102). Next, based on the position information taken over in the processing in step S102, the lane departure prevention control unit 22 determines whether the vehicle 1 has passed the obstacle (step S103).

When it is determined in the processing in step S103 that the vehicle 1 has not yet passed the obstacle (step S103: No), the lane departure prevention control unit 22 determines whether the vehicle 1 is about to depart from the driving lane (in other words, determines whether there is a possibility of lane departure) (step S104). When it is determined in the processing in step S104 that the vehicle 1 is not about to depart from the driving lane (step S104: No), the processing in step S103 is performed.

When it is determined in the processing in step S104 that the vehicle 1 is about to depart from the driving lane (step S104: Yes), the lane departure prevention control unit 22 causes the steering actuator 15 to generate a steering torque (that is, performs steering assist) so that the driving direction of the vehicle 1 is parallel to the lane (step S105). Note that "parallel to the lane" is a concept that includes the case where the driving direction of the vehicle 1 is completely parallel to the lane but also the case where the driving direction of the vehicle 1 is practically parallel to the lane. After that, the processing in step S103 is performed.

When it is determined in the processing in step S103 that the vehicle 1 has passed the obstacle (step S103: Yes), the lane departure prevention control unit 22 determines whether the vehicle 1 is about to depart from the driving lane (step S106). When it is determined in the processing in step S106 that the vehicle 1 is not about to depart from the driving lane (step S106: No), the operation shown in FIG. 3 ends. After that, the processing in step S101 may be performed when a predetermined time has passed.

When it is determined in the processing in step S106 that the vehicle 1 is about to depart from the driving lane (step S106: Yes), the lane departure prevention control unit 22 executes the lane departure prevention control so that the vehicle 1 moves toward the center of the driving lane (step S107). After that, the processing in step S101 may be performed when a predetermined time has passed.

Figure 2B:
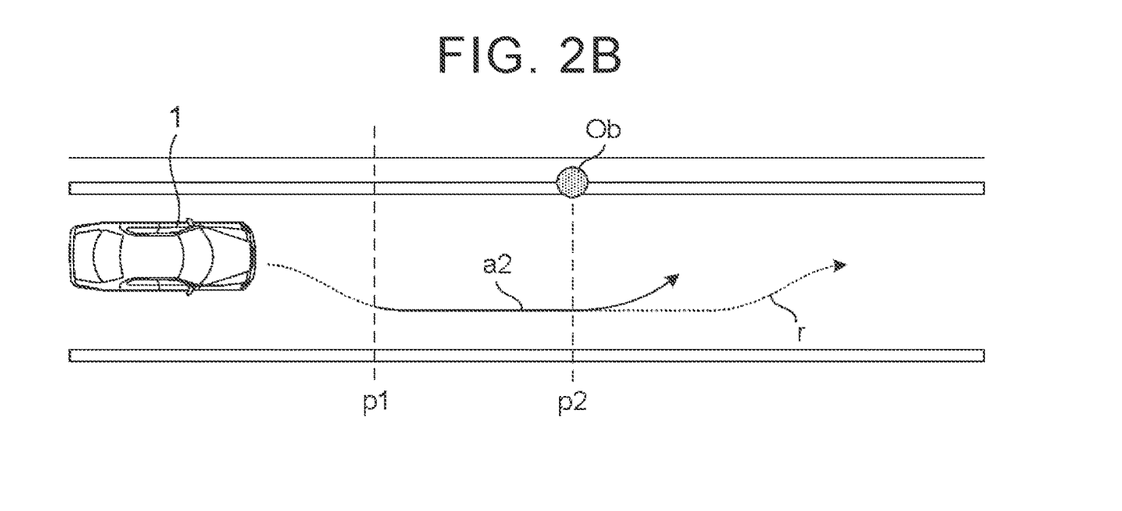
FIG. 2B is a diagram showing an example of the behavior of the vehicle.

For example, the operation shown in FIG. 3, if performed when there is the obstacle Ob in the forward driving direction of the vehicle 1, causes the vehicle 1 to travel along arrow a2 as shown in FIG. 2B. That is, the obstacle avoidance control unit 21 controls at least one of the drive actuator 13, brake actuator 14, and steering actuator 15 so that the vehicle 1 travels along the target trajectory r. When the vehicle 1 is traveling near point p1, the lane departure prevention control unit 22 takes over the position information, which indicates the position of the obstacle, from the obstacle avoidance control unit 21 (corresponds to the processing in step S102 described above). After that, the behavior of the vehicle 1 is controlled by the lane departure prevention control unit 22. The lane departure prevention control unit 22 causes the steering actuator 15 to generate a steering torque until the vehicle 1 passes the obstacle Ob (in other words, until the vehicle 1 passes point p2) so that the driving direction of the vehicle 1 is parallel to the lane (corresponds to the processing in step S105 described above). When the vehicle 1 passes the obstacle Ob, the lane departure prevention control unit 22 executes the lane departure prevention control so that the vehicle 1 moves toward the center of the driving lane (corresponds to the processing in step S107 described above).

Technical Effects

According to the vehicle control device 20 in this embodiment, the lane departure prevention control unit 22 performs the operation shown in FIG. 3 to allow the vehicle 1 to avoid an obstacle in the forward driving direction (for example, an obstacle Ob) and, in addition, to prevent the vehicle 1 from departing from the driving lane. That is, even if the lane departure prevention control is to be executed while the obstacle avoidance control is being executed, the vehicle control device 20 can prevent the vehicle 1 from traveling toward the obstacle that the vehicle 1 should avoid. In other words, the vehicle control device 20 can prevent the behavior, in which the vehicle 1 travels toward the obstacle, even if the behavior is to be performed by the lane departure prevention control.

Second Embodiment

A second embodiment of the vehicle control system will be described with reference to FIG. 4 to FIG. 6. In the second embodiment, the description similar to that of the first embodiment described above will be omitted. In the drawings, the same reference numerals are given to the same elements as those of the first embodiment described above.

Figure 4:
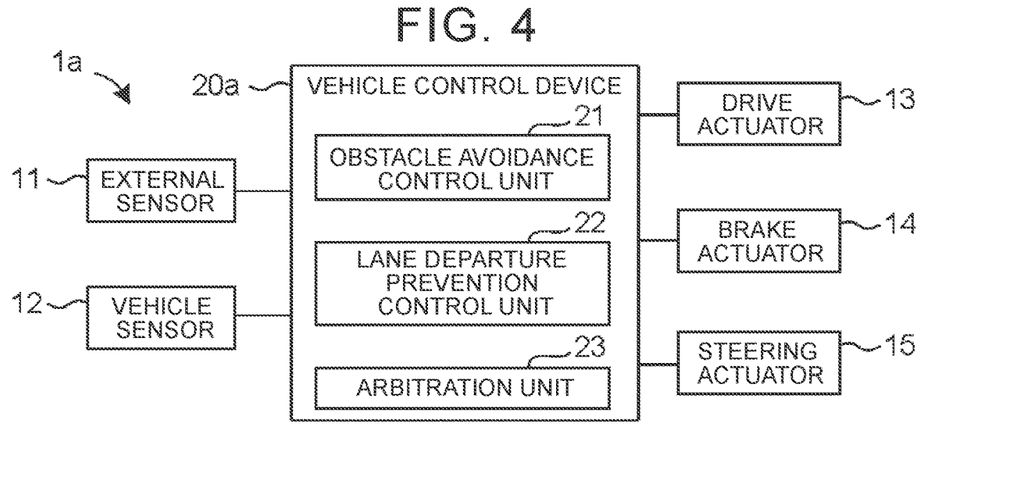
FIG. 4 is a block diagram showing a configuration of a vehicle according to a second embodiment.

In FIG. 4, a vehicle 1a has a vehicle control device 20a. The vehicle control device 20a may include an ECU. The vehicle control device 20a may recognize the surrounding situation of the vehicle 1a based on the output of the external sensor 11. The vehicle control device 20a may obtain the behavior of the vehicle 1a based on the output of the vehicle sensor 12. The vehicle control device 20a may set the target trajectory of the vehicle 1a based on the surrounding situation of the vehicle 1a recognized as described above. The vehicle control device 20a may control at least one of the drive actuator 13, brake actuator 14, and steering actuator 15 according to the behavior of the vehicle 1a, obtained as described above, so that the vehicle 1a travels along the target trajectory. That is, the vehicle control device 20a may drive the vehicle 1a autonomously.

The vehicle control device 20a includes therein the obstacle avoidance control unit 21, the lane departure prevention control unit 22, and an arbitration unit 23, as logically constructed logic blocks or physically implemented processing circuits. The arbitration unit 23 arbitrates between the obstacle avoidance control unit 21 and the lane departure prevention control unit 22.

Figure 5A:
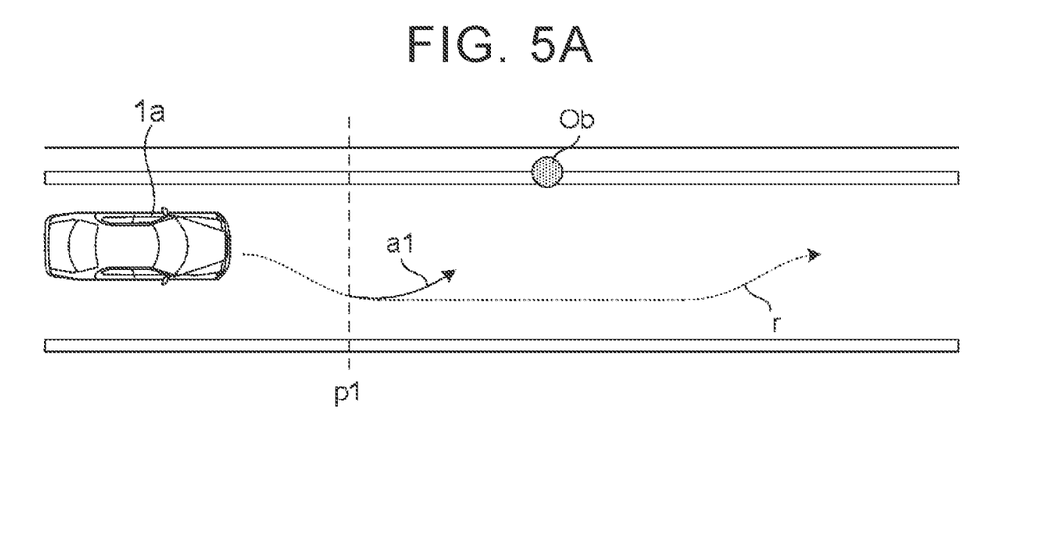
FIG. 5A is a diagram showing another example of the behavior of the vehicle.

FIG. 5A is a drawing corresponding to FIG. 2A. As described in the first embodiment above, if no action is taken while the obstacle avoidance prevention control is being executed, the lane departure prevention control unit 22 executes the lane departure prevention control, resulting in the possibility that the vehicle 1a may travel toward the obstacle Ob that the vehicle 1a should avoid.

Figure 6:
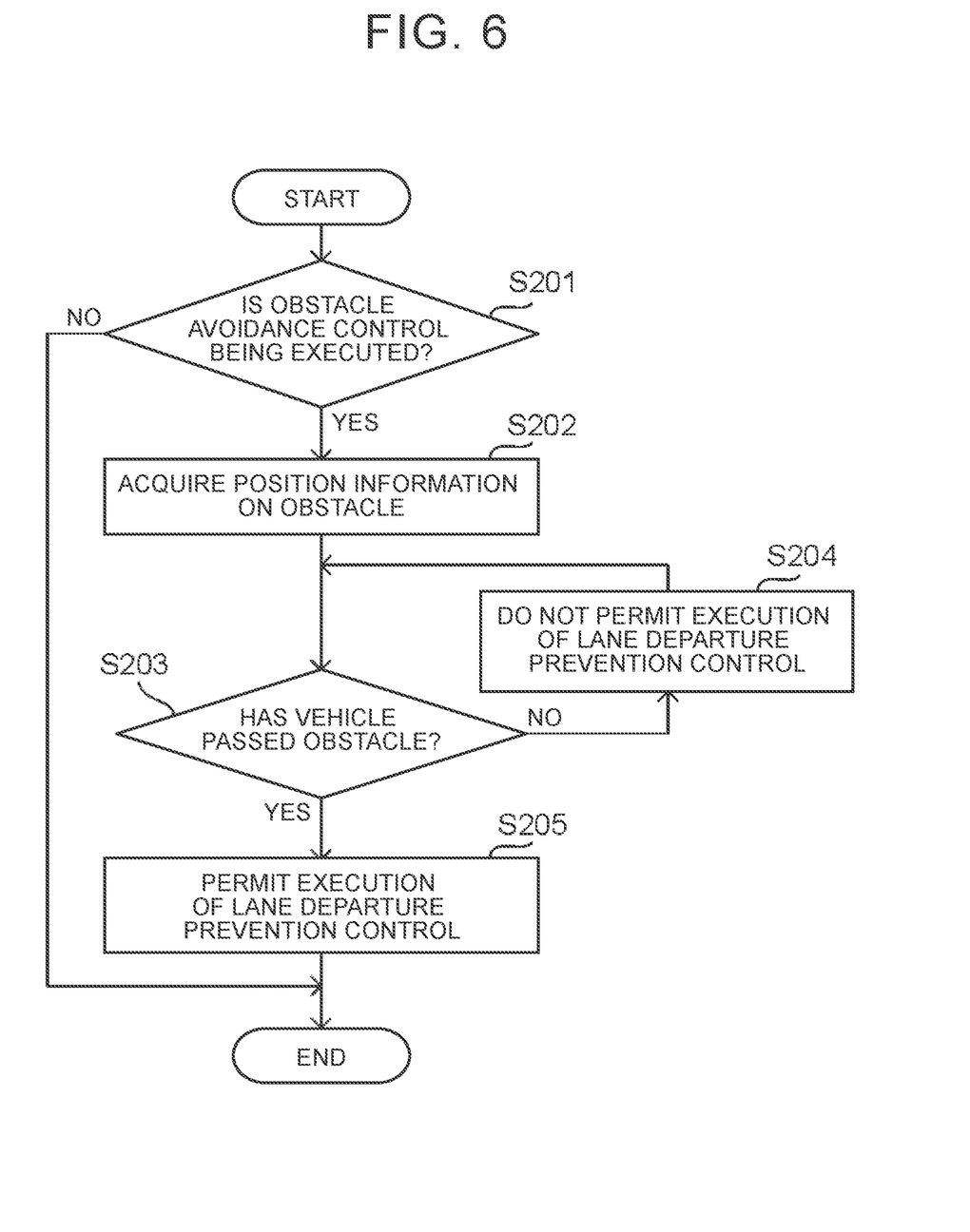
FIG. 6 is a flowchart showing the operation of a vehicle control device according to the second embodiment.

In view of the technical problem described above, the arbitration unit 23 performs the operations shown in the flowchart in FIG. 6 in this embodiment. In FIG. 6, the arbitration unit 23 determines whether the obstacle avoidance control is being executed by the obstacle avoidance control unit 21 (step S201). When it is determined in the processing in step S201 that the obstacle avoidance control is not being executed (step S201: No), the operation shown in FIG. 6 ends. After that, the processing in step S201 may be performed when a predetermined time has passed. That is, the operation shown in FIG. 6 may be repeatedly performed at a cycle corresponding to the predetermined time.

When it is determined in the processing in step S201 that the obstacle avoidance control is being executed (step S201: Yes), the arbitration unit 23 acquires the position information indicating the position of the obstacle (step S202). The arbitration unit 23 may acquire the position information from the obstacle avoidance control unit 21 or from the surrounding situation of the vehicle 1a that is recognized based on the output of the external sensor 11. The arbitration unit 23 determines whether the vehicle 1a has passed the obstacle based on the position information acquired in the processing in step S202 (step S203).

When it is determined in the processing in step S203 that the vehicle 1a has not yet passed the obstacle (step S203: No), the arbitration unit 23 does not permit the execution of the lane departure prevention control (step S204). After that, the processing in step S203 is performed. The wording that "the arbitration unit 23 does not permit the execution of the lane departure prevention control" may mean at least one of the following. That is, (i) the arbitration unit 23 may input the cancel signal that cancels the output (for example, control signal) of the lane departure prevention control unit 22 to at least one of the drive actuator 13, brake actuator 14, and steering actuator 15. (ii) The arbitration unit 23 may prevent the output (for example, control signal) of the lane departure prevention control unit 22 from being input to at least one of the drive actuator 13, brake actuator 14, and steering actuator 15. (iii) The arbitration unit 23 may set the priority of the obstacle avoidance control higher than the priority of the lane departure prevention control.

When it is determined in the processing in step S203 that the vehicle 1a has passed the obstacle (step S203: Yes), the arbitration unit 23 permits the execution of the lane departure prevention control (step S205). After that, the processing in step S201 may be performed when a predetermined time has passed. The wording "the arbitration unit 23 permits the execution of lane departure prevention control" may mean at least one of the following. That is, (i) the arbitration unit 23 may input the output (for example, control signal) of the lane departure prevention control unit 22 to at least one of the drive actuator 13, brake actuator 14, and steering actuator 15 while, at the same time, may prevent the output (for example, control signal) of the obstacle avoidance control unit 21 from being input to at least one of the drive actuator 13, brake actuator 14, and steering actuator 15. (ii) The arbitration unit 23 may set the priority of the lane departure prevention control higher than the priority of the obstacle avoidance control.

Figure 5B:
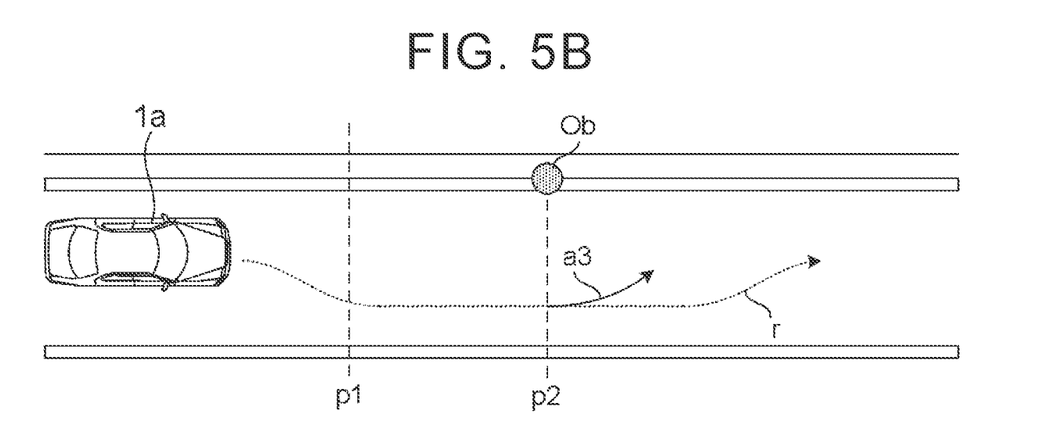
FIG. 5B is a diagram showing another example of the behavior of the vehicle.

For example, when there is an obstacle Ob in the forward driving direction of the vehicle 1a as shown in FIG. 5B, the operation shown in FIG. 6 is performed. As a result, the vehicle 1a will travel along the target trajectory r based on the obstacle avoidance control executed by the obstacle avoidance control unit 21 until the vehicle 1a passes the obstacle Ob (in other words, until the vehicle 1a passes point p2). This is because the execution of the lane departure prevention control is not permitted. When the vehicle 1a passes the obstacle Ob, the lane departure prevention control unit 22 executes the lane departure prevention control so that the vehicle 1 moves toward the center of the driving lane. As a result, the vehicle 1a travels along arrow a3. That is, in the second embodiment, the behavior of the vehicle 1a is controlled by the obstacle avoidance control unit 21 until the vehicle 1a passes the obstacle Ob. After the vehicle 1a passes the obstacle Ob, the behavior of the vehicle 1a is controlled by the lane departure prevention control unit 22.

Technical Effects

According to the vehicle control device 20a in this embodiment, the behavior, in which the vehicle 1a travels toward an obstacle, can be prevented even if performed by the lane departure prevention control, as in the vehicle control device 20 in the first embodiment described above.

Aspects of the disclosure derived from the embodiments described above will be described below:

One aspect of the present disclosure is a vehicle control device that is able to execute obstacle avoidance control and lane departure prevention control. The obstacle avoidance control is configured to set a target trajectory for avoiding an obstacle that is present in a forward traveling direction of a host vehicle and is configured to control the host vehicle so that the host vehicle travels along the target trajectory. The lane departure prevention control is configured to prevent the host vehicle from departing from the driving lane when the host vehicle is about to depart from the driving lane. The driving lane is a lane in which the host vehicle is traveling. When the lane departure prevention control is to be executed while the obstacle avoidance control is being executed to avoid the obstacle, the vehicle control device is configured to execute the lane departure prevention control to cause the host vehicle to move toward the center of the driving lane after the host vehicle passes the obstacle.

The vehicle control device may include a first control unit configured to be able to execute the obstacle avoidance control and a second control unit configured to be able to execute the lane departure prevention control. When the lane departure prevention control is to be executed while the obstacle avoidance control is being executed to avoid the obstacle, the first control unit may be configured to send position information indicating the position of the obstacle to the second control unit and the second control unit may be configured to execute the lane departure prevention control to cause the host vehicle to move toward the center of the driving lane after the host vehicle passes the position of the obstacle indicated by the position information. In the embodiment described above, "the obstacle avoidance control unit 21" corresponds to an example of "the first control unit" and "the lane departure prevention control unit 22" corresponds to an example of "the second control unit."

When the lane departure prevention control is to be executed while the obstacle avoidance control is being executed to avoid the obstacle, the second control unit may be configured to execute the lane departure prevention control to cause the host vehicle to travel along the driving lane until the host vehicle passes the position of the obstacle indicated by the position information.

The vehicle control device may include a first control unit configured to be able to execute the obstacle avoidance control, a second control unit configured to be able to execute the lane departure prevention control, and an arbitration unit configured to arbitrate between the first control unit and the second control unit. When the lane departure prevention control is to be executed while the obstacle avoidance control is being executed to avoid the obstacle, the arbitration unit may be configured to arbitrate between the first control unit and the second control unit so that the obstacle avoidance control is executed with priority over the lane departure prevention control until the host vehicle passes the obstacle and the arbitration unit may be configured to arbitrate between the first control unit and the second control unit so that the lane departure prevention control until is executed with priority over the obstacle avoidance control after the host vehicle passes the obstacle. In the embodiment described above, "the arbitration unit 23" corresponds to an example of "the arbitration unit."

It is to be understood that the present disclosure is not limited to the embodiments described above but may be changed as appropriate within the scope of claims and within the spirit and the concept of the present disclosure understood from this specification and that a vehicle control device to which such changes are added is also included in the technical scope of the present disclosure.

What is claimed is:

1. A vehicle control device configured to execute obstacle avoidance control and lane departure prevention control, the obstacle avoidance control being configured to set a target trajectory for avoiding an obstacle that is present in a forward traveling direction of a vehicle and configured to control the vehicle so that the vehicle travels along the target trajectory, the lane departure prevention control being configured to prevent the vehicle from departing from a driving lane in a case where the vehicle is about to depart from the driving lane, the driving lane being a lane in which the vehicle is traveling, wherein in a case where the vehicle control device executes the lane departure prevention control while the vehicle control device is executing the obstacle avoidance control to avoid the obstacle, the vehicle control device is configured to:

determine whether the vehicle is about to depart from the driving lane in a case where the vehicle control device determines that the vehicle has not passed the obstacle yet;

execute the lane departure prevention control so that a driving direction of the vehicle is parallel to the driving lane in a case where the vehicle control device determines that the vehicle has not passed the obstacle yet and that the vehicle is about to depart from the driving lane;

determine whether the vehicle is about to depart from the driving lane again in a case where the vehicle control device determines that the vehicle has passed the obstacle; and execute the lane departure prevention control so that the vehicle moves toward a center of the driving lane in a case where the vehicle control device determines that the vehicle has passed the obstacle and that the vehicle is about to depart from the driving lane.

2. The vehicle control device according to claim 1, wherein the vehicle control device comprises:
a first control unit configured to execute the obstacle avoidance control; and
a second control unit configured to execute the lane departure prevention control, wherein
in a case where the second control unit executes the lane departure prevention control while the first control unit is executing the obstacle avoidance control is to avoid the obstacle, the first control unit is configured to send position information indicating a position of the obstacle to the second control unit and the second control unit is configured to execute the lane departure prevention control to cause the vehicle to move toward the center of the driving lane after the vehicle passes the position of the obstacle indicated by the position information.

3. The vehicle control device according to claim 1, the vehicle control device comprising:
a first control unit configured to execute the obstacle avoidance control;
a second control unit configured to execute the lane departure prevention control; and
an arbitration unit configured to arbitrate between the first control unit and the second control unit, wherein, in a case where the second control unit executes the lane departure prevention control while the first control unit is executing the obstacle avoidance control to avoid the obstacle, the arbitration unit is configured to arbitrate between the first control unit and the second control unit so that
the first control unit executes the obstacle avoidance control with priority over the second control unit executing the lane departure prevention control until the vehicle passes the obstacle, and
the second control unit executes the lane departure prevention control with priority over the first control unit executing the obstacle avoidance control after the vehicle passes the obstacle.

4. The vehicle control device according to claim 1, wherein the vehicle control device is configured to end the obstacle avoidance control in a case where the vehicle control device determines that the vehicle has passed the obstacle.

5. A vehicle control device comprising a processor configured to:
execute obstacle avoidance control that sets a target trajectory to avoid an obstacle that is present in a forward traveling direction of a vehicle and that controls the vehicle to travel along the target trajectory; and
execute lane departure prevention control to prevent the vehicle from departing from a driving lane in a case where the vehicle is about to depart from the driving lane, the driving lane being a lane in which the vehicle is traveling,
wherein, in a case where the processor executes the lane departure prevention control while the processor is executing the obstacle avoidance control to avoid the obstacle, the processor is configured to
determine whether the vehicle has passed the obstacle;
determine whether the vehicle is about to depart from the driving lane in a case where the processor determines that the vehicle has not passed the obstacle, change a driving direction of the vehicle to be parallel to the driving lane in a case where the processor determines that the vehicle has not passed the obstacle and that the vehicle is about to depart from the driving lane,
determine whether the vehicle is about to depart from the driving lane again in a case where the processor determines that the vehicle has passed the obstacle, and
move the vehicle toward a center of the driving lane in a case where the processor determines that the vehicle has passed the obstacle and that the vehicle is about to depart from the driving lane.

6. The vehicle control device according to claim 5, wherein the processor is configured to end the obstacle avoidance control in a case where the processor determines that the vehicle has passed the obstacle.

7. A vehicle control device comprising a processor configured to:
execute obstacle avoidance control that sets a target trajectory to avoid an obstacle that is present in a forward traveling direction of a vehicle and that controls the vehicle to travel along the target trajectory;
execute lane departure prevention control to prevent the vehicle from departing from a driving lane in a case where the vehicle is about to depart from the driving lane, the driving lane being a lane in which the vehicle is traveling; and
determine whether the vehicle has passed the obstacle, wherein
in a case where the processor determines that the vehicle has not passed the obstacle and the processor executes the lane departure prevention control while the processor is executing the obstacle avoidance control to avoid the obstacle, the processor is configured to
input a cancel signal of the lane departure prevention control to at least one of a drive actuator, a brake actuator, and a steering actuator, the cancel signal canceling a control signal of the lane departure prevention control,
prevent a control signal of the lane departure prevention control from being input to at least one of the drive actuator, the brake actuator, and steering actuator, and
set priority of the obstacle avoidance control to be higher than priority of the lane departure prevention control, and
in a case where the processor determines that the vehicle has passed the obstacle, the processor is configured to
input the control signal of the lane departure prevention control to at least one of the drive actuator, the brake actuator, and the steering actuator,
prevent a control signal of the obstacle avoidance control from being input to at least one of the drive actuator, the brake actuator, and the steering actuator, and
set the priority of the lane departure prevention control to be higher than the priority of the obstacle avoidance control.

8. The vehicle control device according to claim 7, wherein the processor is configured to end the obstacle avoidance control in a case where the processor determines that the vehicle has passed the obstacle.

9. The vehicle control device according to claim 5, wherein the processor is further configured to move the vehicle to a position farther from the obstacle than the center of the driving lane in a case where the processor executes the lane departure prevention control.

10. The vehicle control device according to claim 5, wherein the processor is further configured to change the driving direction of the vehicle to be parallel to the driving lane in a case where:
  the processor determines that the vehicle has not passed the obstacle and that the vehicle is about to depart from the driving lane;
  the vehicle is in a position farther from the obstacle than the center of the driving lane; and
  the driving direction is not parallel to the driving lane.

* * * * *